United States Patent Office 3,781,336
Patented Dec. 25, 1973

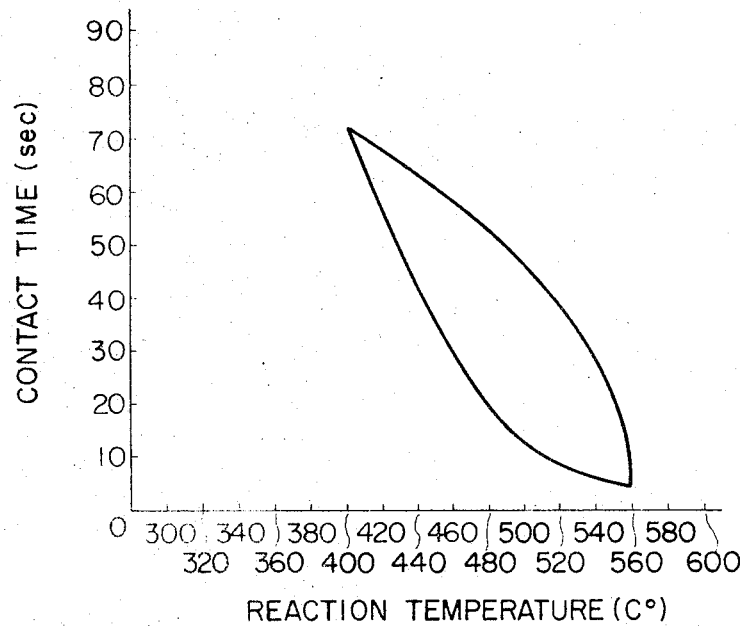

3,781,336
METHOD FOR PRODUCING METHACRYLIC ACID AND ITS ESTERS
Masazumi Chono, Oimachi, and Hitoshi Nakajima, Masayoshi Taguchi, and Noriaki Matsuo, Tokyo, Japan, assignors to Asahi Kasei Kogyo Kabushiki Kaisha, Osaka, Japan
Filed Feb. 24, 1972, Ser. No. 229,110
Claims priority, application Japan, Feb. 24, 1971, 46/8,632; Sept. 23, 1971, 46/73,793
Int. Cl. C07c 69/54
U.S. Cl. 260—486 D                 7 Claims

ABSTRACT OF THE DISCLOSURE

An economical method for producing methacrylic acid and its esters from at least one organic compound selected from the group consisting of isobutyric acid and its esters by the dehydrogenation reaction with sulfur is provided. This method comprises adding said organic compound to the reaction system together with 0.3–70.0 gram atoms of sulfur vapour and as a catalyst, 0.5–30.0 mols of hydrogen sulfide per one mol of said organic compound at a temperature in the range of 400°–560° C.

DESCRIPTION THE THE INVENTION

This invention relates to a method for dehydrogenating isobutyric acid and its esters by reacting with sulfur vapour on heating.

Heretofore various methods for dehydrogenating organic compounds have been proposed. For example, a method in which a solid catalyst is used, another method in which halogen is used and a further method in which sulfur is used are known.

However, the method in which a solid catalyst is used, cannot be used in practice because a raw material, i.e., a lower saturated aliphatic carboxylic acid and its esters shows drastic decomposition and effects decarboxylation, hydrolysis and scission of carbon-to-carbon bonds.

On the other hand, the method in which iodine is used as a halogen, requires recovery of iodine because it is expensive but separation from resultant product and purification thereof are difficult. Further, the corrosiveness of iodine compounds also makes this method disadvantageous.

Although the method in which sulfur is used, has no such disadvantage but it is not practical because yield is usually low.

French Pat. No. 1,590,431 discloses a method for dehydrogenating a hydrocarbon such a ethylbenzene, butene, etc. with sulfur vapour in the presence of an inert gas but this method also has disadvantage in the points that the space time yield of objective product is low, a partial pressure of objective products in the outlet gas is low and hence the recovering process thereof becomes expensive. In this regard, this method is not suitable as a dehydrogenation method of isobutyric acid and its esters.

It is an object of the present invention to provide a method for dehydrogenating isobutyric acid and its esters which has no such disadvantages as those of the above-mentioned.

After continuing strenuous study in order to overcome the above-mentioned disadvantages in the dehydrogenation of isobutyric acid and its esters, we have discovered that a methacrylic acid and its esters can be obtained with a better yield by adding, as a catalyst, a specified amount of hydrogen sulfide in the dehydrogenation reaction of isobutyric acid and its esters with sulfur vapour.

According to the method of the present invention, in the dehydrogenation reaction of at least one kind of organic compounds selected from the group consisting of isobutyric acid and its esters, with sulfur, 0.3–70.0 gram atoms of sulfur vapour and 0.5–30.0 mols of hydrogen sulfide as catalyst, per mol of said organic compounds as the raw material added to the reaction system to effect contact in a temperature range of 400°–560° C.

The hydrogen sulfide used in the method of the present invention, performs a function of a catalyst which promotes the formation of methacrylic acid and its esters in the reaction of isobutyric acid and its esters with sulfur vapour. At the same time, it has the effectiveness in controlling side reactions.

This kind of homogeneous dehydrogenation reaction probably proceeds by a radical reaction mechanism but it is surprising that hydrogen sulfide has catalytic action upon such a reaction. We have no intention of elucidating the nature of catalytic effectiveness of hydrogen sulfide but it is believed that the effect is caused by the activation of dehydrogenation agent of sulfur vapour with hydrogen sulfide.

The catalytic function of hydrogen sulfide will be illustrated in case of dehydrogenation of methyl isobutyrate (MIB) to methyl methacrylate (MMA) as follows:

The experimental results are shown in Tables 1 and 2.

TABLE 1

| | Reaction conditions, partial pressure of— | | | Results of reaction, percent | | |
|---|---|---|---|---|---|---|
| | Sulfur (atm.) | Hydrogen sulfide (atm.) | Nitrogen (atm.) | Conversion of MIB | One pass yield of MMA | Selectivity of MMA |
| Experiment number: | | | | | | |
| 1 | 0.32 | | | 13.8 | 7.8 | 56.8 |
| 2 | 0.32 | | 1.0 | 13.7 | 7.7 | 56.2 |
| 3 | 0.32 | 1.0 | | 24.0 | 20.5 | 8.55 |

Other conditions of these experiments: partial pressure of MIB was set to 0.32 atmosphere and reaction temperature was set to 500° C.

TABLE 2

| | Reaction conditions, partial pressure of— | | | Results of reaction, percent | | |
|---|---|---|---|---|---|---|
| | Sulfur (atm.) | Hydrogen sulfide (atm.) | Nitrogen (atm.) | Conversion of MIB | One pass yield of MMA | Selectivity of MMA |
| Experiment number: | | | | | | |
| 1 | 0.50 | | 0.65 | 7.6 | 6.3 | 82.5 |
| 2 | 0.20 | | 0.65 | 10.8 | 6.0 | 55.5 |
| 3 | 0.05 | 0.65 | | 21.4 | 18.6 | 87.0 |
| 4 | 0.20 | 0.65 | | 30.0 | 25.3 | 84.5 |

Other conditions of these experiments: partial pressure of MIB was set to 0.15 atmosphere and reaction temperature was set to 500° C.

Further the partial pressures of sulfur in the above-mentioned Tables 1 and 2 as well as hereinafter were calculated by assuming its mean molecular weight as 7 (molecular weight of 224).

As apparent from the above-mentioned experimental results of Table 1, if hydrogen sulfide having the same partial pressure is caused to be present as a catalyst in place of inert gas (of nitrogen gas) without changing the partial pressures of methyl isobutyrate and sulfur, substantial increases of conversions of methyl isobutyrate and of selectivity of methyl methacrylate were observed. This shows that sulfur vapour acts upon methyl isobutyrate in different manner when hydrogen sulfide is caused to be present in place of inert gas.

In Table 2, when the difference of yields of objective products in the experiments No. 1 and No. 2 are compared with the difference of yields of objective products in the experiments No. 3 and No. 4, it can be seen that the dependency of yield of objective product upon the partial pressure of sulfur vapour in case of the addition of hydrogen sulfide is different from that in case of the addition of inert gas.

As for the amount of hydrogen sulfide to be added to the reaction system as a catalyst, it is preferable to select in the range of 0.5 to 30.0 mols per mol of isobutyric acid or its ester to be used as a raw material.

When the amount of hydrogen sulfide used is less than the above-mentioned range, the yield of objective product becomes drastically lower. On the other hand when the amount is greater than the above-mentioned range, hydrogen sulfide has still a function of catalyst. It is, however, not preferable, because it probably suppresses the reaction in the view point of equilibrium. This fact can be understood from the result of reaction shown in the following Table 3.

TABLE 3

| Reaction conditions | | Result of reaction, percent | |
|---|---|---|---|
| Partial pressure of hydrogen sulfide (atm.) | Hydrogen sulfide/ MIB | One pass yield of MMA | Selectivity of MMA |
| 0.15 | 0.3 | 5.3 | 78.5 |
| 0.25 | 0.5 | 16.2 | 81.3 |
| 2.5 | 5.0 | 30.8 | 86.5 |
| 15.0 | 30.0 | 31.8 | 88.0 |

Other reaction conditions: the partial pressure of MIB was 0.5 atmosphere, the partial pressure of sulfur was 0.3 atmosphere, reaction temperature was 510° C. and space velocity was 150 per hour.

However, considering from the economical operational condition, it is preferable that the amount of hydrogen sulfide used is in the range of 4.0–18.0 mols.

As for the amount of sulfur vapour to be added to the reaction system in the method of the present invention, it is preferable to use 0.3–70.0 gram atoms per mol of isobutyric acid and (or) its ester [which corresponds to 4.3–1000 molar percent per mol of isobutyric acid and (or) its esters].

If the amount of sulfur to be used is in the range of 1.4–70.0 gram atoms per mol of isobutyric acid and (or) its esters, the objective product can be obtained with a high one pass yield, a high selectivity and a high space time yield. However, from economical view point as a commercial process, the amount of sulfur to be fed is preferably in the range of 1.4–17.5 gram atoms. The amount of sulfur used in an amount greater than this range, is not preferable because the yield of objective product (particularly selectivity) is drastically reduced.

On the other hand, when the amount of sulfur used is in the range of 0.3 to less than 1.4 gram atoms per mol of isobutyric acid and (or) its esters, the yield of objective product is somewhat reduced but compared with the case where the amount of sulfur used is greater than 1.4 gram atoms, the production of by-products due to sulfur, e.g. carbon disulfide, carbonyl sulfide, hydrogen sulfide, tarry sulfur products, etc. is reduced exceedingly and conversion of sulfur fed becomes higher, the amount of unreacted sulfur becomes less, and hence the advantage in the simplicity of separation and recovery steps can be gained. However, from economical view point as a commercial process, the amount of sulfur is preferably in the range of 0.5 to less than 1.4 gram atoms. If the amount of sulfur used is smaller than the above-mentioned range, both of one pass yield and selectivity of objective product of methacrylic acid and (or) its ester are greatly reduced, the by-product of hydrocarbon, carbon dioxide and carbon monoxide becomes violent and hence the above-mentioned range is not practical.

The above-mentioned fact relating to the use of sulfur will be understood from the results of reaction shown in Table 4.

TABLE 4

| Sulfur/MIB ratio of partial pressure | Percent | | | | |
|---|---|---|---|---|---|
| | Conversion of sulfur | One pass yield of MMA | Selectivity of MMA | One pass yield of— | |
| | | | | COS | CS$_2$ |
| 0.015 | 65.3 | 1.8 | 26.5 | 0.23 | 0.38 |
| 0.045 | 66.1 | 6.8 | 76.8 | 0.20 | 0.37 |
| 0.06 | 65.5 | 7.2 | 79.2 | 0.22 | 0.40 |
| 0.09 | 58.3 | 12.5 | 78.9 | 0.38 | 0.67 |
| 0.15 | 46.5 | 14.6 | 81.3 | 0.52 | 0.78 |
| 0.30 | 26.5 | 22.1 | 83.2 | 1.8 | 2.1 |
| 1.0 | | 30.8 | 84.0 | | |
| 10.0 | | 32.3 | 70.5 | | |
| 20.0 | | 10.2 | 39.3 | | |

Other conditions of these experiments: partial pressure of MIB was 0.12 atmosphere, partial pressure of hydrogen sulfide was 0.85 atmosphere, reaction temperature was 490° C. and space velocity was 125 per hour.

The reaction temperature employed in the method of the present invention is selected in the range of 400°–560° C. Even on the outside of this range, methylacrylic acid and (or) its esters are formed but when the reaction temperature is lower than this range, the yields of methacrylic acid and (or) its esters are drastically reduced and when it is higher than this range, the decomposition of objective product and side reactions occur violently, reducing the yield and increasing the by-product of sulfur compounds.

The contact time is selected from the range of 5 to 72 seconds. Even on the outside of this range, methacrylic acid and (or) its esters are formed but when the contact time is shorter than this, the yields of methacrylic acid and (or) its esters are drastically reduced and the contact time longer than this, is not preferable because side reactions occur violently, reducing the yield, particularly the selectivity.

It will be understood from the following experimental results shown in Table 5 that the selection of the reaction temperature and contact time should be made along the above-mentioned line in order to obtain the objective products of methacrylic acid and (or) its esters with high yields.

TABLE 5

| Reaction conditions | | Reaction result, percent | |
|---|---|---|---|
| Reaction time (° C.) | Contact time (sec.) | One pass yield of MMA | Selectivity of MMA |
| 370 | 30.0 | 0.6 | |
| 370 | 90.0 | 5.6 | 70.5 |
| 400 | 72.0 | 19.2 | 74.2 |
| 450 | 60.0 | 23.5 | 78.1 |
| 470 | 25.0 | 18.6 | 88.6 |
| 480 | 46.0 | 22.9 | 84.3 |
| 500 | 24.0 | 23.6 | 86.5 |
| 500 | 45.0 | 24.9 | 82.5 |
| 520 | 8.0 | 18.3 | 83.5 |
| 540 | 28.0 | 24.8 | 80.5 |
| 560 | 5.0 | 17.8 | 78.2 |
| 590 | 3.0 | 10.6 | 59.2 |
| 590 | 20.0 | 3.8 | 18.0 |

Other conditions of these experiments: partial pressure of methyl isobutyrate was 0.3 atmosphere, partial pressure of sulfur was 0.3 atmosphere and contact time was calculated from the following equation:

$$\text{Contact time} = \frac{\text{Volume of reaction vessel}}{\text{Feeding velocity of raw material}}$$
(Converted into normal state)

As seen from Table 5, an optimum combination of reaction temperature and contact time for obtaining a higher reaction yield can be selected from the range of temperature and contact time of area shown in the attached drawing.

The raw materials used in the method of the present invention are isobutyric acid and its esters and the corresponding products are methacrylic acid and its esters. The relation of these raw materials and corresponding products will be shown concretely hereinafter. Methyl methacrylate is produced from methyl isobutyrate and likewise ethyl methacrylate from ethyl isobutyrate, propyl methacrylate from propyl isobutyrate, isopropyl methacrylate from isopropyl isobutyrate, butyl methacrylate from butyl isobutyrate, isobutyl methacrylate from isobutyl isobutyrate and methacrylic acid from isobutyric acid.

When the method of the present invention is used practically, an inert gas can be used but it is not always necessary.

The reaction pressure used in the practice of the present invention can be either super-atmospheric, atmospheric, or sub-atmospheric so long as it is in the range where a gas phase is maintained under a reaction condition.

In the practice of the process of the present invention, parts or whole of isobutyric acid (and/or its esters), sulfur and hydrogen sulfide can be supplied to a reactor after mixed in advance or can be supplied to effect mixing in the reactor. Sulfur can be supplied to a reactor after melted at first, and sent to an evaporator to form in the state of sulfur vapour. If sulfur is sent to a reactor after it is contacted with hydrogen sulfide either before or after melting, the hydrogen sulfide is dissolved in the molten sulfur and an advantage is attained in the point that the sending of molten sulfur becomes thereby easier. Since hydrogen sulfide is an effective catalyst in the method of the present invention, this method is advantageous because sulfur containing hydrogen sulfide, as it is, can be fed to a reactor.

As for the pressure of hydrogen sulfide at the time of contact with sulfur, any pressure can be used but a pressure greater than atmospheric is preferable. The contact time in that case is preferable to be longer than 0.1 second.

Further the addition of hydrogen sulfide to the reaction system in the method of the present invention does not make the reaction step of the method complicated. Separation and recovery of it from an effluent product is very easy. Moreover since used hydrogen sulfide can be circulated into a reaction vessel to be used again, the method of the present invention is very beneficial from commercial viewpoint. Further the present method has advantage in the easiness of temperature control because of its weak endothermic reaction. This is a point different from the case of oxidative dehydrogenation where oxygen is used.

This invention is further illustrated by the following non-limitative examples.

Example 1

A quartz glass reaction tube was filled with Raschig rings to be used as a heat transfer medium, and was maintained at a temperature of 500° C. in a tubular electric furnace. A gaseous mixture of methyl isobutyrate, sulfur vapour, and hydrogen sulfide (in a molar ratio of 15:15:70) was then sent into the reactor at a space velocity of 150 per hour.

The outlet gas composition was measured to determine the reaction result by means of gas chromatography, which revealed that the conversion of methyl isobutyrate was 23.6%, and a yield of methyl methacrylate was 88.5%, based on the amount of converted methyl isobutyrate.

Comparative Example 1

A gaseous mixture of methyl isobutyrate, sulfur vapour, and nitrogen (in a molar ratio of 15:15:70) was passed through the reaction tube under the same conditions as in Example 1 at a space velocity of 150 per hour.

As a result of the reaction, a conversion of methyl isobutyrate of 15.2% and the yield of methyl methacrylate of 63.5%, based on the amount of converted methyl isobutyrate, were obtained.

Example 2

A stainless steel reaction tube was filled with Raschig rings to be used as a heat transfer medium, and was maintained at a temperature of 500° C. in a tubular electric furnace. A gaseous mixture of methyl isobutyrate, sulfur vapour, and hydrogen sulfide (in a molar ratio of 7:7:86) was then sent into the reactor at a space velocity of 150 per hour and a reaction pressure of 3.0 kg./cm.$^2$.

As a result of the reaction, conversion of methyl isobutyrate of 36.8% and a yield of methyl methacrylate of 84.8%, based on the amount of converted methyl isobutyrate, were obtained.

Example 3

In a similar manner as in Example 1, a reaction tube, with no heat transfer medium filled therein, was maintained at a temperature of 510° C. in an electric furnace. A gaseous mixture of ethyl isobutyrate, sulfur vapour, and hydrogen sulfide (in a molar ratio of 20:15:65) was then sent to the reactor at a space velocity of 200 per hour.

As a result of the reaction, a conversion of ethyl isobutyrate of 21.2% and a yield of ethyl methacrylate of 83.6%, based on the amount of converted ethyl isobutyrate, were obtained.

Example 4

In a similar manner as in Example 1, a reaction tube was maintained at a temperature of 500° C. A gaseous mixture of isobutyric acid, sulfur vapour, and hydrogen sulfide (in a molar ratio of 15:15:70) was then sent to the reactor at a space velocity of 150 per hour.

As a result of the reaction, a conversion of isobutyric acid of 24.3% and a yield of methacrylic acid of 71.5%, based on the amount of converted isobutyric acid, were obtained.

Comparative Example 2

Under the same conditions as in Example 4, a gaseous mixture of isobutyric acid, sulfur vapour, and nitrogen (in a molar ratio of 15:15:70) was sent to the reactor at a space velocity of 150 per hour.

As a result of the reaction, a conversion of isobutyric acid of 6.2%, and a yield of methacrylic acid of 53.2%, based on the amount of converted isobutyric acid, were obtained.

Example 5

In a similar manner as in Example 1, a reaction tube was maintained at a temperature of 480° C. A gaseous mixture of propyl isobutyrate, sulfur vapour, and hydrogen sulfide (in a molar ratio of 15:10:75) was then sent to the reactor at a space velocity of 150 per hour.

As a result of the reaction, a conversion of propyl isobutyrate of 16.2% and a yield of propyl methacrylate of 83.2%, based on the amount of converted propyl isobutyrate, were obtained.

Example 6

In a similar manner as in Example 3, a reaction tube was maintained at a temperature of 490° C. A gaseous mixture of isopropyl isobutyrate, sulfur vapour, and hydrogen sulfide (in a molar ratio of 20:15:65) was then sent to the reactor at a space velocity of 180 per hour.

As a result of the reaction, a conversion of isopropyl isobutyrate of 16.8% and a yield of isopropyl methacrylate of 78.5%, based on the amount of converted isopropyl isobutyrate, were obtained.

Example 7

A quartz glass reaction tube was filled with aluminum phosphate to be used as a heat transfer medium, and was maintained at a temperature of 490° C. in a tubular electric furnace. A gaseous mixture of butyl isobutyrate, sulfur vapour, and hdyrogen sulfide (in a molar ratio of 15:10:75) was sent to the reactor at a space velocity of 150 per hour.

As a result of the reaction, a conversion of butyl isobutyrate of 20.2% and a yield of butyl methacrylate of 78.6%, based on the amount of converted butyl isobutyrate, were obtained.

Example 8

In a similar manner as in Example 1, a reaction tube was maintained at a temperature of 470° C. A gaseous mixture of isobutyl isobutyrate, sulfur vapour, and hydrogen sulfide (in a molar ratio of 15:15:70) was then sent to the reactor at a space velocity of 150 per hour.

As a result of the reaction, a conversion of isobutyl isobutyrate of 17.8% and a yield of isobutyl methacrylate of 74.6%, based on the amount of converted isobutyl isobutyrate, were obtained.

Example 9

A quartz glass reaction tube was filled with Raschig rings to be used as a heat transfer medium, and was maintained at a temperature of 500° C. in a tubular electric furnace. A gaseous mixture of methyl isobutyrate, sulfur vapour, and hydrogen sulfide (in a molar ratio of 15:2.5:82.5) was then sent to the reactor at a space velocity of 130 per hour.

As a result of the reaction, a conversion of methyl isobutyrate of 13.6% and a yield of methyl methacrylate of 79.5%, based on the amount of converted methyl isobutyrate, were obtained. A conversion of sulfur was 48.5%, and one pass yields of such by-produced sulfur compounds as carbon disulfide and carbonyl sulfide were 0.4% and 0.7%, respectively.

Example 10

In a similar manner as in Example 9, a reaction tube was maintained at a temperature of 490° C. A gaseous mixture of ethyl isobutyrate, sulfur vapour, and hydrogen sulfide (in a molar ratio of 10:1.2:88.8) was then sent to the reactor at a space velocity of 110 per hour.

As a result of the reaction, a conversion of ethyl isobutyrate of 11.2% and a yield of ethyl methacrylate of 73.6%, based on the amount of converted ethyl isobutyrate, were obtained. A conversion of sulfur was 45.6%, and one pass yields of such by-produced sulfur compounds as carbon disulfide and carbonyl sulfide were 0.36% and 0.43%, respectively.

Example 11

In a similar manner as in Example 9, a reaction tube was maintained at a temperature of 505° C. A gaseous mixture of isobutyric acid, sulfur vapour, and hydrogen sulfide (in a molar ratio of 10:1.5:88.5) was then sent to the reactor at a space velocity of 100 per hour.

As a result of the reaction, a conversion of isobutyric acid of 15.8% and a yield of methacrylic acid being 68.3%, based on the amount of converted isobutyric acid, were obtained. A conversion of sulfur was 43.2%, and the one pass yields of such by-produced sulfur compounds as carbon disulfide and carbonyl sulfide were 0.28% and 0.35%, respectively.

Example 12

In a similar manner as in Example 9, a reaction tube was maintained at a temperature of 485° C. A gaseous mixture of propyl isobutyrate, sulfur vapour, and hydrogen sulfide (in a molar ratio of 15:1.3:83.7) was then sent to the reactor at a space velocity of 130 per hour.

As a result of the reaction, a conversion of propyl isobutyrate of 10.6% and a yield of propyl methacrylate of 80.6%, based on the amount of converted propyl isobutyrate, were obtained. A conversion of sulfur was 38.9%, and one pass yields of such by-produced sulfur compounds as carbon disulfide and carbonyl sulfide were 0.2% and 0.32%, respectively.

Example 13

In a similar manner as in Example 9, a reaction tube was maintained at a temperature of 480° C. A gaseous mixture of butyl isobutyrate, sulfur vapour, and hydrogen sulfide (in a molar ratio of 10:1.0:89) was then sent to reactor at a space velocity of 100 per hour.

As a result of the reaction, a conversion of butyl isobutyrate of 11.5% and a yield of butyl methacrylate of 71.6%, based on the amount of converted butyl isobutyrate, were obtained. A conversion of sulfur was 39.6%, and one pass yields of such by-produced sulfur compounds as carbon disulfide and carbonyl sulfide were 0.16% and 0.22%, respectively.

Example 14

In a similar manner as in Example 9, a reaction tube was maintained at a temperature of 500° C. A gaseous mixture of isopropyl isobutyrate, sulfur vapour, and hydrogen sulfide (in a molar ratio of 13:1.8:85.2) was then sent to the reactor at a space velocity of 150 per hour.

As a result of the reaction, a yield of isopropyl methacrylate of 70.6% was obtained, based on the amount of isopropyl isobutyrate. A conversion of sulfur was 40.6%, and one pass yields of such by-produced sulfur compounds as carbon disulfide and carbonyl sulfide were 0.21% and 0.32%, respectively.

Example 15

In a similar manner as in Example 9, a reactor tube was maintained at a temperature of 475° C. A gaseous mixture of isobutyl isobutyrate, sulfur vapour, and hydrogen sulfide (in a molar ratio of 15:2.5:82.5) was then sent to the reactor at a space velocity of 105 per hour.

As a result of the reaction, a conversion of isobutyl isobutyrate of 10.5% and a yield of isobutyl methacrylate of 66.2%, based on the amount of converted isobutyl isobutyrate, were obtained. A conversion of sulfur was 38.6%, and one pass yields of such by-produced sulfur compounds as carbon disulfide and carbonyl sulfide were 0.12% and 0.26%, respectively.

What is claimed is:

1. A method for producing methacrylic acid or its ester by the dehydrogenation of isobutyric acid or an isobutyric acid ester with sulfur which comprises contacting isobutyric acid or an isobutyric acid ester with 0.3 to 70.0 gram atoms of sulfur vapor and 0.5 to 30.0 mols of hydrogen sulfide as a catalyst per mol of isobutyric acid or isobutyric acid ester at a temperature of 400°–560° C.

2. A method according to claim 1 wherein said contacting is carried out for 5 to 72 seconds.

3. A method according to claim 1 wherein the amount of sulfur vapour is in the range of 1.4–70.0 gram atoms per mol of said organic compound.

4. A method according to claim 1 wherein the amount of sulfur vapour is in the range of 0.3 to less than 1.4 gram atoms per mole of said organic compound.

5. A method according to claim 1 wherein the amount of hydrogen sulfide is in the range of 4.0 to 18.0 mol per mol of said organic compound.

6. A method according to claim 1 wherein sulfur is contacted with hydrogen sulfide before it is melted and then charged to a reactor.

7. A method according to claim 1 wherein sulfur is contacted with hydrogen sulfide, melted in molten state and then charged to a reactor.

References Cited

UNITED STATES PATENTS

| | | | |
|---|---|---|---|
| 2,111,509 | 3/1938 | Loder | 260—486 D |
| 2,378,501 | 6/1945 | Ratchford et al. | 260—486 D |

LORRAINE A. WEINBERGER, Primary Examiner

P. J. KILLOS, Assistant Examiner

U.S. Cl. X.R.

260—526 N